May 8, 1934.  J. F. CUSHING  1,957,761
BALL JOINT FOR CONDUITS
Filed April 22, 1932   2 Sheets-Sheet 1

Inventor
John F. Cushing
By Rector, Hibben, Davis & Macauley, Attys.

May 8, 1934.                J. F. CUSHING                1,957,761
                         BALL JOINT FOR CONDUITS
                    Filed April 22, 1932        2 Sheets-Sheet 2

Inventor
John F. Cushing
By Rector, Hibben, Davis & Macauley, Attys.

Patented May 8, 1934

1,957,761

UNITED STATES PATENT OFFICE 1,957,761

BALL JOINT FOR CONDUITS

John F. Cushing, Evanston, Ill., assignor to Great Lakes Dredge & Dock Company, Chicago, Ill., a corporation of New Jersey Application April 22, 1932, Serial No. 606,779

5 Claims. (Cl. 285—93)

This invention relates to improvements in joints for connecting conduits such as the sections of a conduit which is employed in delivering the fluid material discharged from dredges and the like employed in making excavations beneath the water surface of rivers, harbors and the like. It is desirable that the adjacent sections of such a conduit have relative movement so that the conduit may be made to conform largely to the contour of the earth or other supports over which it extends and be made to deliver the material at the desired point. This requires the employment of a joint between adjacent conduit sections which will permit universal movement while at the same time maintaining a substantially fluid-tight connection between the sections. It is also important that the joint be of such construction that the sections may be readily connected and disconnected, even under rough water conditions, without danger to the operators and without injury to the parts of the joint or of the conduit.

The principal object of the present invention is to provide an improved ball joint for conduits which is simple and rugged in construction and which comprises a minimum number of parts which have to be manipulated by the operators in connecting or disconnecting adjacent conduit sections. A further object of the invention is to provide a joint for conduits comprising a ball section fixed on one conduit and adapted to cooperate with parts carried by the other conduit which have the maximum bearing surface on the ball section so that the pressure per square inch upon the coacting parts is a minimum. Still another object is to provide a ball joint which permits a relatively wide range of movement between adjacent conduit sections without excessive wear upon the coacting parts of the joint. A further object of the invention is to provide a ball joint comprising a housing and a relatively movable gland adapted to embrace the ball, with a pair of members pivotally connecting the gland and the housing for permitting relative movement in one direction, without requiring movement of the gland on the ball, while relative movement in a transverse direction is permitted by the rotation of the ball within the gland. Another object of the invention is to provide a ball joint comprising a housing and a gland which maintain good surface contact with the ball in all relative positions of the connected conduit sections and which are adapted to prevent the collection of sand or sediment between the contacting surfaces. Another object of the invention is to provide a ball joint comprising a housing adapted to engage the ball and a gland which is normally carried by the ball in combination with a pair of connecting bolts carried by the gland and adapted to pass through slots in the housing. Other objects relate to various features of construction and arrangement which will appear more fully hereinafter.

The nature of the invention will be understood from the following specification taken with the accompanying drawings, in which one embodiment is illustrated. In the drawings, Fig. 1 shows a top plan view of two conduit sections connected by the improved joint of the present invention;

Figure 1:
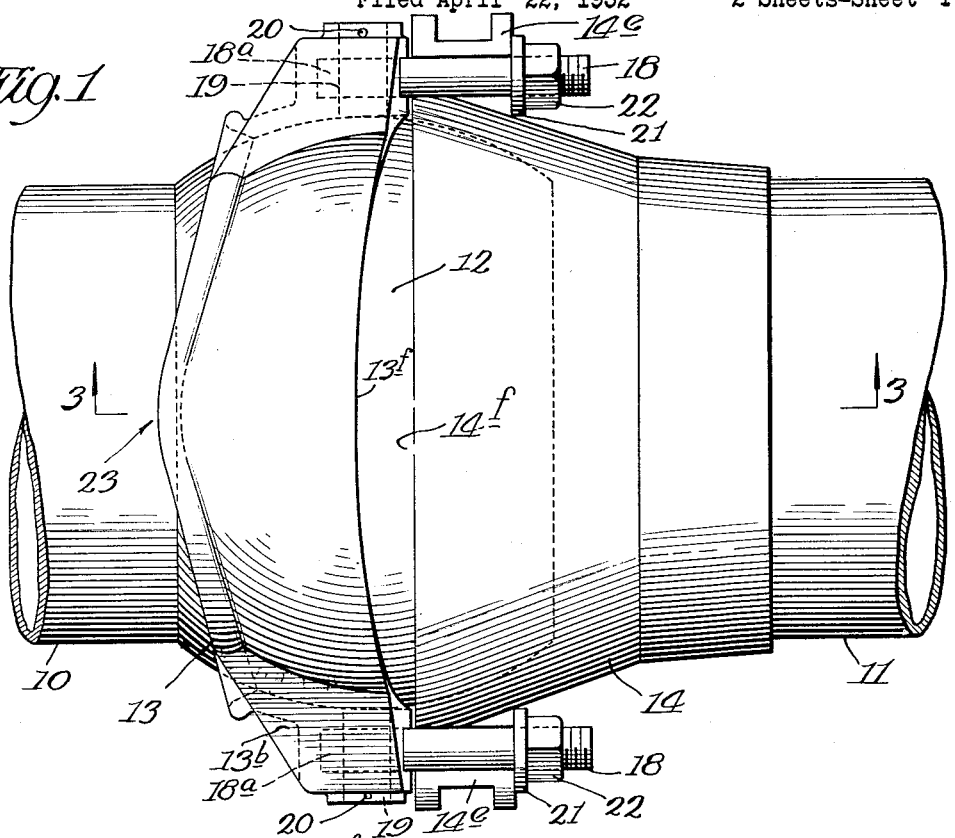

As illustrated in the drawings, the invention is shown connecting two conduits or conduit sections 10 and 11. The section 10 has secured to the end thereof an annular ring or ball section 12 having an external surface in the form of a section of a sphere. This spheroidal section 12 forms an enlargement at the end of the conduit 10 and is adapted to be embraced by a gland 13 and a housing 14, the latter of which is counterbored as shown at $14^a$ to receive the end of the other conduit section 11 to which it is rigidly secured. The housing 14 flares outwardly from the end of the conduit 11 and is provided with an internal socket having a surface $14^b$, forming a section of a sphere, which is adapted to receive and coact with a portion of the surface of the ball section 12. Between the end of the conduit 11 and the surface $14^b$, the housing 14 is provided with an annular groove $14^c$ in which is mounted a hard metal ring 15 forming a liner to prevent excessive wear by the abrasive action of sand or the like contained in the material being pumped. Adjacent its outer edge, the flared portion of the housing 14 is provided with an internal annular groove $14^d$ in which are mounted two packing rings 16 of rubber or the like and a metallic retaining ring 17 located at the outer edge of the groove and having an outer inclined surface coacting with the correspondingly inclined surface at the edge of the groove so that it is retained in position within the housing without other fastening means. These rings are adapted to maintain a fluid-tight connection between the housing and the ball section 12 when the ball is clamped within the socket of the housing by the gland 13.

The gland 13 is in the form of a continuous annular ring, of irregular shape, provided with an internal annular surface $13^a$, forming a section of a sphere, which is adapted to coact with the external surface of the ball section 12. The gland 13 is provided on opposite sides with enlarged bosses 13$^b$, each of which is provided with a recess or socket 13$^c$, of rectangular cross-section, adapted to receive the head 18$^a$ of one of the connecting bolts 18. The heads of these bolts are apertured for engagement by pivot pins 19 which engage holes in the walls of the recesses 13$^c$ and are held in position by vertically extending pins 20. These bolts 18 project from the recesses or sockets 13$^c$ and are adapted to engage hook-shaped brackets 14$^e$ which are formed integrally with opposite sides of the housing 14. These brackets are provided on their upper sides with U-shaped notches 14$^f$ which receive the bolts 18 when the parts of the joint are connected and the bolts are then held in this position by means of washers 21 and nuts 22. By tightening these nuts, the gland 13 may be forced toward the housing 14 to hold the ball section 12 securely within the socket 14$^b$ of the housing.

Figure 2:
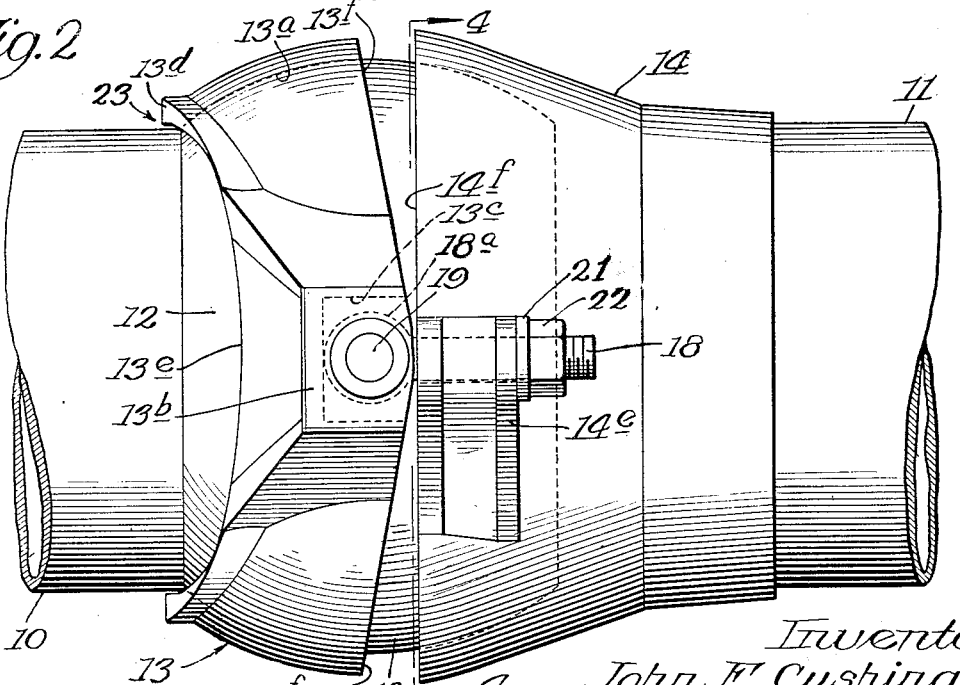
Fig. 2 shows a side elevation of the structure illustrated in Fig. 1.
Figure 3:
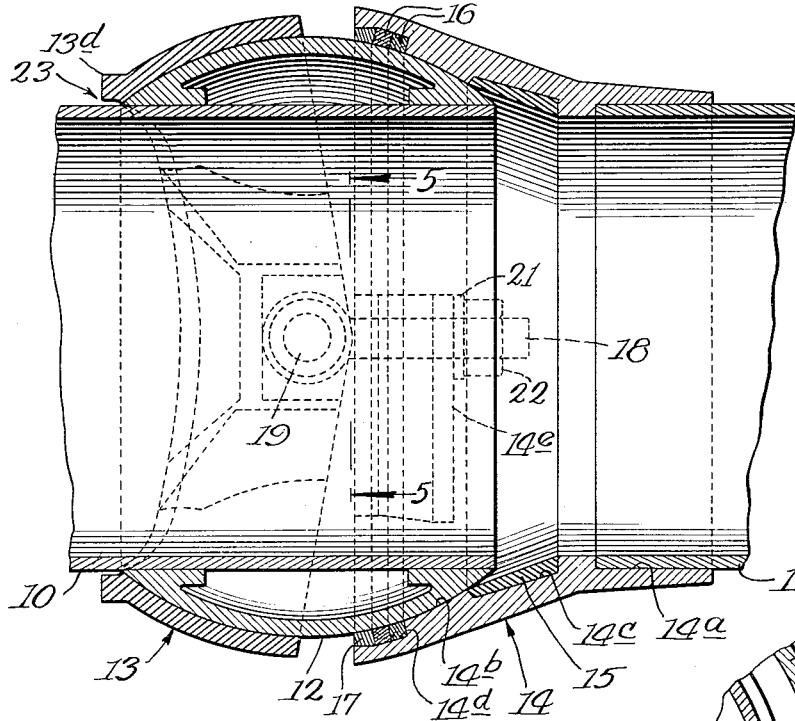
Fig. 3 shows a longitudinal vertical section on the line 3—3 of Fig. 1.
Figure 4:
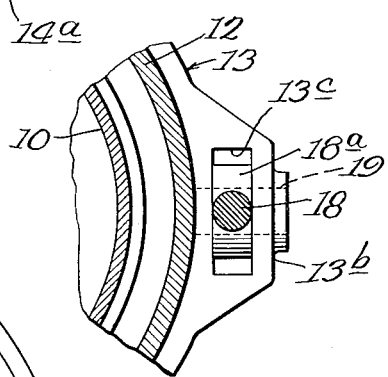
Fig. 4 shows a transverse vertical section on the line 4—4 of Fig. 2.
Figure 5:
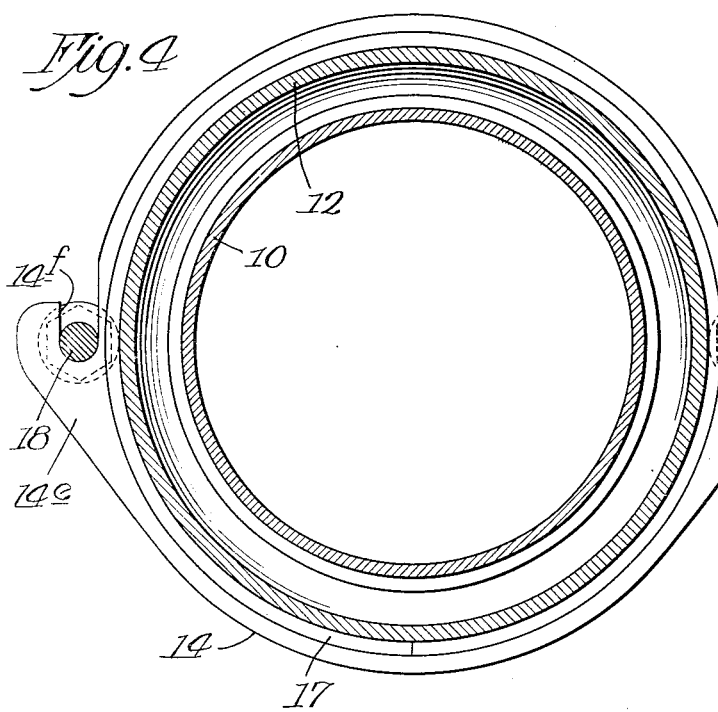
Fig. 5 shows a detail section on the line 5—5 of Fig. 3.

The gland 13 is so constructed that it extends as far as possible over the surface of the ball section 12. The edge thereof adjacent the conduit section 10 is provided with an outwardly flared rib 13$^d$ and at points coincident with a vertical plane passing through the axes of the connected conduit sections, this marginal rib 13$^d$ is located in close proximity to the surfaces of the conduit sections 10 at the edge of the ball section 12, as shown at 23. Between these upper and lower points 23, the rib 13$^d$ curves inwardly as shown at 13$^e$, away from the conduit section 10, thus leaving space to allow angular movement of the conduit section 10 with respect to the section 11 in a horizontal direction. On the other side of the gland 13, adjacent to the housing 14, it is provided with an edge surface 13$^f$ which is inclined away from the adjacent vertical end face 14$^f$ of the housing from both sides of each of the connecting bolts 18, thus providing angular spaces which permit the swinging of the ball 12 and the gland 13 in a vertical plane about the pivot pins 19 of the connecting bolts. When the parts are connected, as shown in Figs. 1 and 2, the vertical movement takes place by a movement of the gland about the pins 13 and a movement of the ball section 12 within the socket of the housing 14, without any relative movement of the gland 13 with respect to the ball section 12, thus minimizing the wear upon the gland.

It is only when there is relative angular movement of the two conduit sections 10 and 11 in a vertical plane that the ball section 12 rotates within the surfaces of both the gland 13 and the housing 14. With the proportions illustrated, either conduit section may have movement in a vertical plane of about ten degrees each side of a horizontal center line before bringing the gland 13 into contact with the surface 14$^f$ of the housing and the curved edges 13$^e$ of the gland will permit a horizontal swing of either conduit section of about eighteen degrees each side of the center line. These proportions may, of course, be varied as desired but it is desirable to maintain a large area of contact between the gland and the ball section 12 in order to minimize the pressure per unit of area and the wear caused by relative movement of the parts. Owing to the size of the openings between the gland 13 and the edge of the housing 14, there is little danger of sand or sediment clogging the parts of the joint or getting between the coacting surfaces. The gland 13 functions primarily to maintain the ball section 12 within the socket of the housing and lateral thrust of the ball section in any direction is taken by the housing and not by the gland.

The pivotal mounting of the bolts 18 on the gland and the slotted formation of the brackets 14$^e$ which are to be engaged by them permits the bolts to be passed readily into engagement with the brackets of the housing when the ball section 12 is inserted in the socket of the housing, and, since the gland is rotatable on the ball, it may be readily turned to the proper position to bring the bolts into alignment with the brackets. The joint may thus be readily assembled under very rough weather conditions on or beneath the surface of the water without danger of injury to the workmen and without danger of losing control of either conduit section during the coupling process.

Although one form of the invention has been shown and described by way of illustration, it will be understood that it may be constructed in various other forms within the scope of the appended claims.

I claim:

1. The combination in a joint for connecting two conduits, of a ball section adapted to be secured on one of said conduits, a housing adapted to be secured on the other of said conduits and having a socket to receive said ball section, a gland surrounding said ball section, a single pair of bolts detachably secured to said housing, and pins forming a pivotal connection between said bolts and said gland.

2. The combination with a pair of conduits, of a ball section secured on one of said conduits, a housing secured to the other of said conduits and having a socket to receive a portion of said ball section, a gland extending around said ball section and having a curved surface coacting therewith, bolts pivotally connected to said gland, and brackets carried by opposite sides of said housing and having notches to receive said bolts.

3. The combination with a pair of conduits, of a ball section secured on one of said conduits, a housing secured to the other of said conduits and having a socket to receive a portion of said ball section, a gland extending around said ball section and having a curved surface coacting therewith, a pair of bolts pivotally connected to said gland on opposite sides thereof, and a pair of brackets carried by said housing and provided on their upper sides with slots to receive said bolts.

4. The combination with a pair of conduits, of a ball section secured on one of said conduits, a housing secured to the other of said conduits and having a socket to receive a portion of said ball section, a gland extending around said ball section and having a curved surface coacting therewith, said gland having bosses on opposite sides thereof with recesses formed in said bosses, a pair of bolts each pivotally mounted in one of said recesses, and a pair of brackets formed on opposite sides of said housing and having U-shaped slots therein to receive said bolts.

5. The combination with a pair of conduits, of a ball section secured on one of said conduits, a housing secured to the other of said conduits and having a socket to receive a portion of said ball section, a gland extending around said ball section and having a curved surface coacting therewith, a pair of bolts pivotally connected to said gland on opposite sides thereof, and brackets carried by said housing for engaging said bolts, said gland having its inner edge surface inclined away from said housing on opposite sides of said bolts and having its outer edge concaved inwardly opposite said bolts.

JOHN F. CUSHING.